Sept. 8, 1953     G. P. LUCIUS     2,651,160
COTTON HARVESTER
Filed April 27, 1950     5 Sheets-Sheet 5
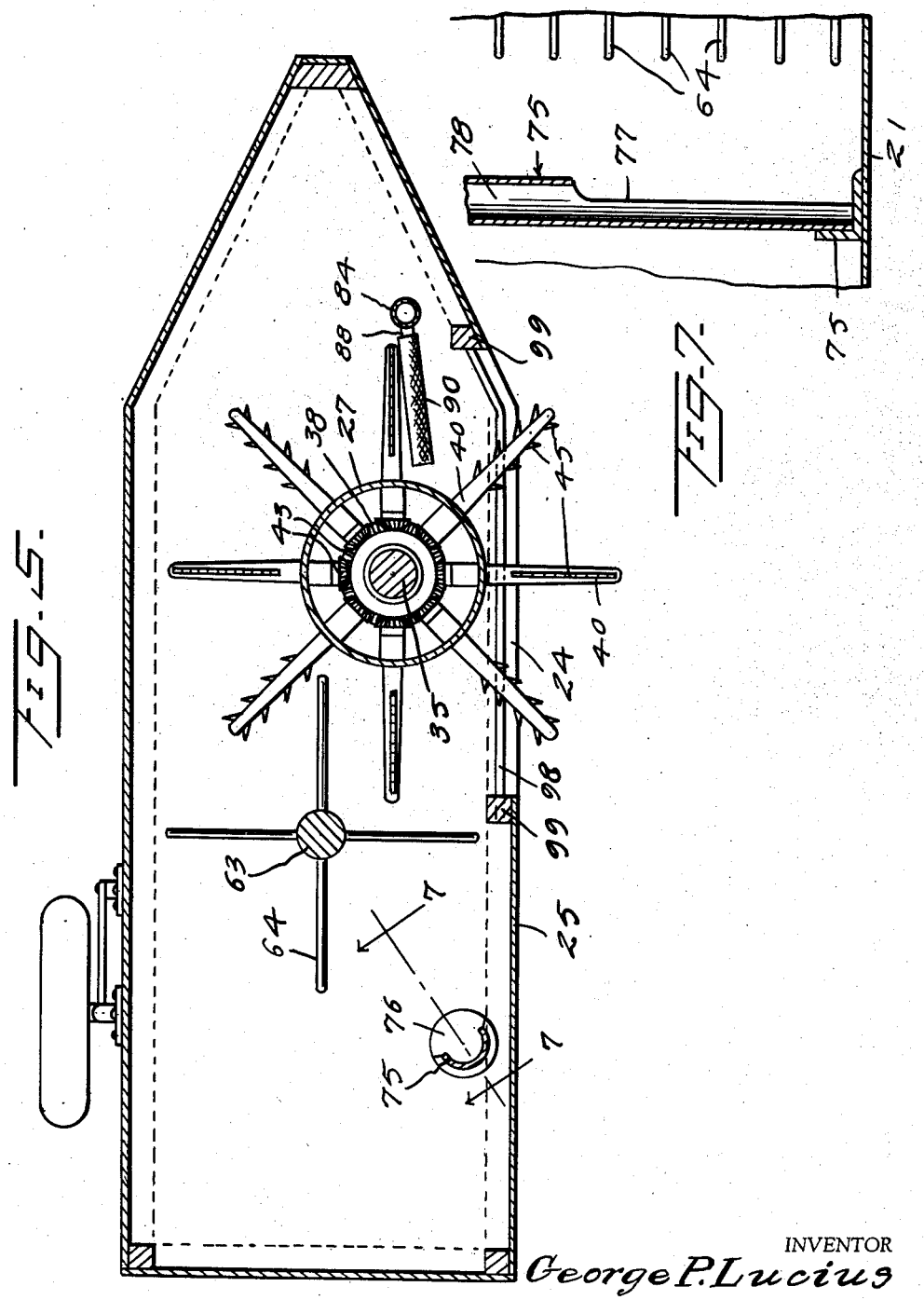
INVENTOR
George P. Lucius
BY Kimmel & Crowell
ATTORNEYS Patented Sept. 8, 1953

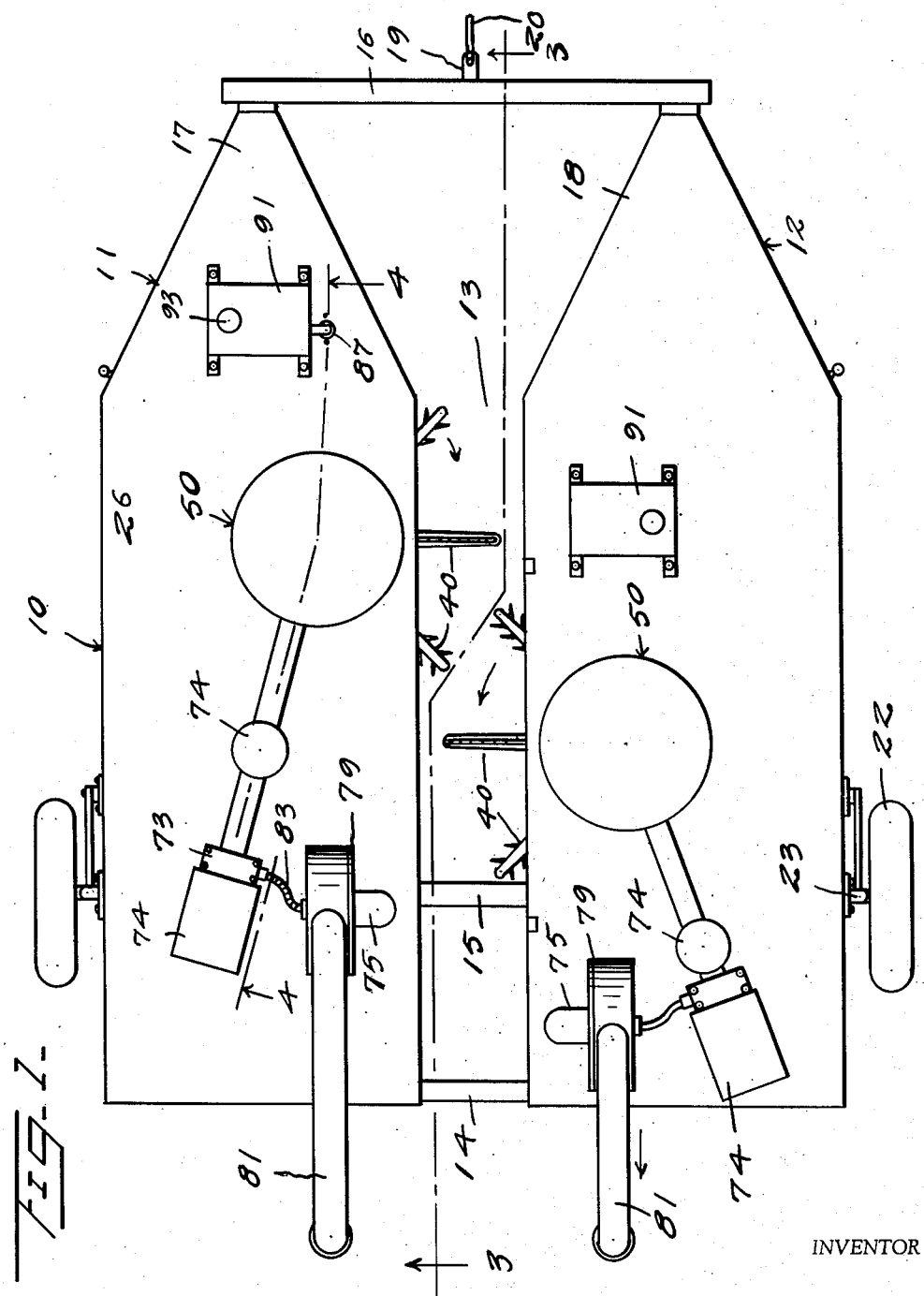

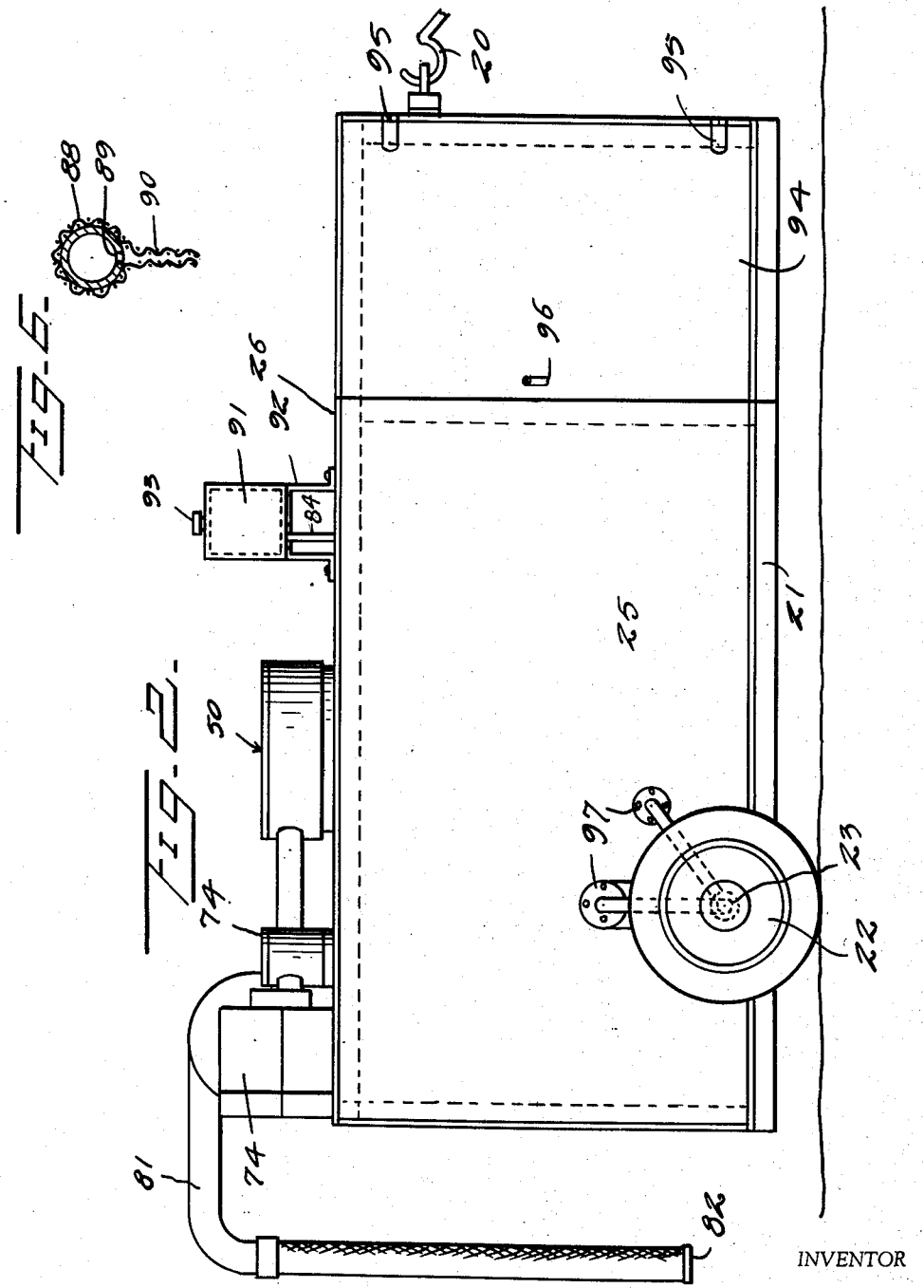

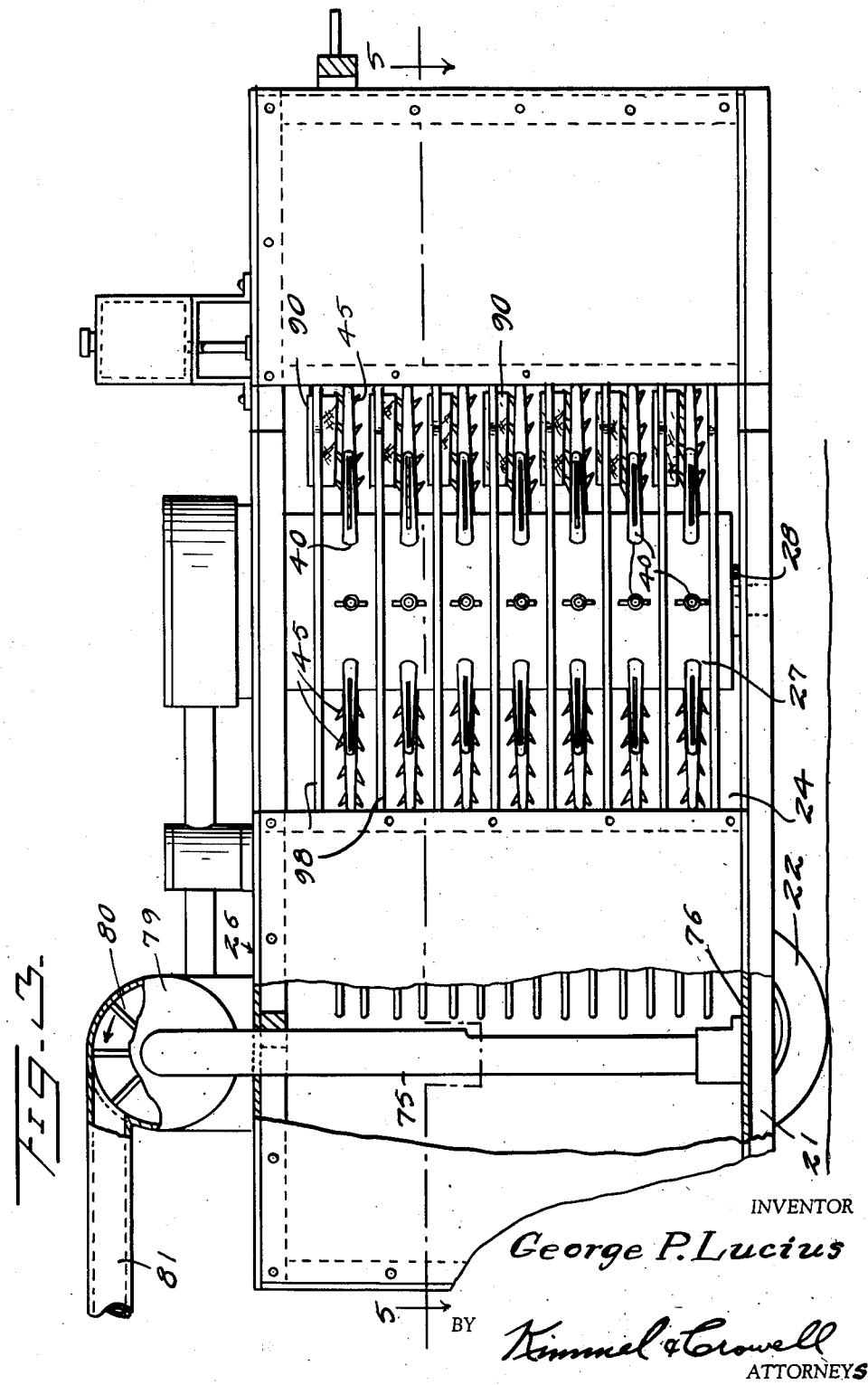

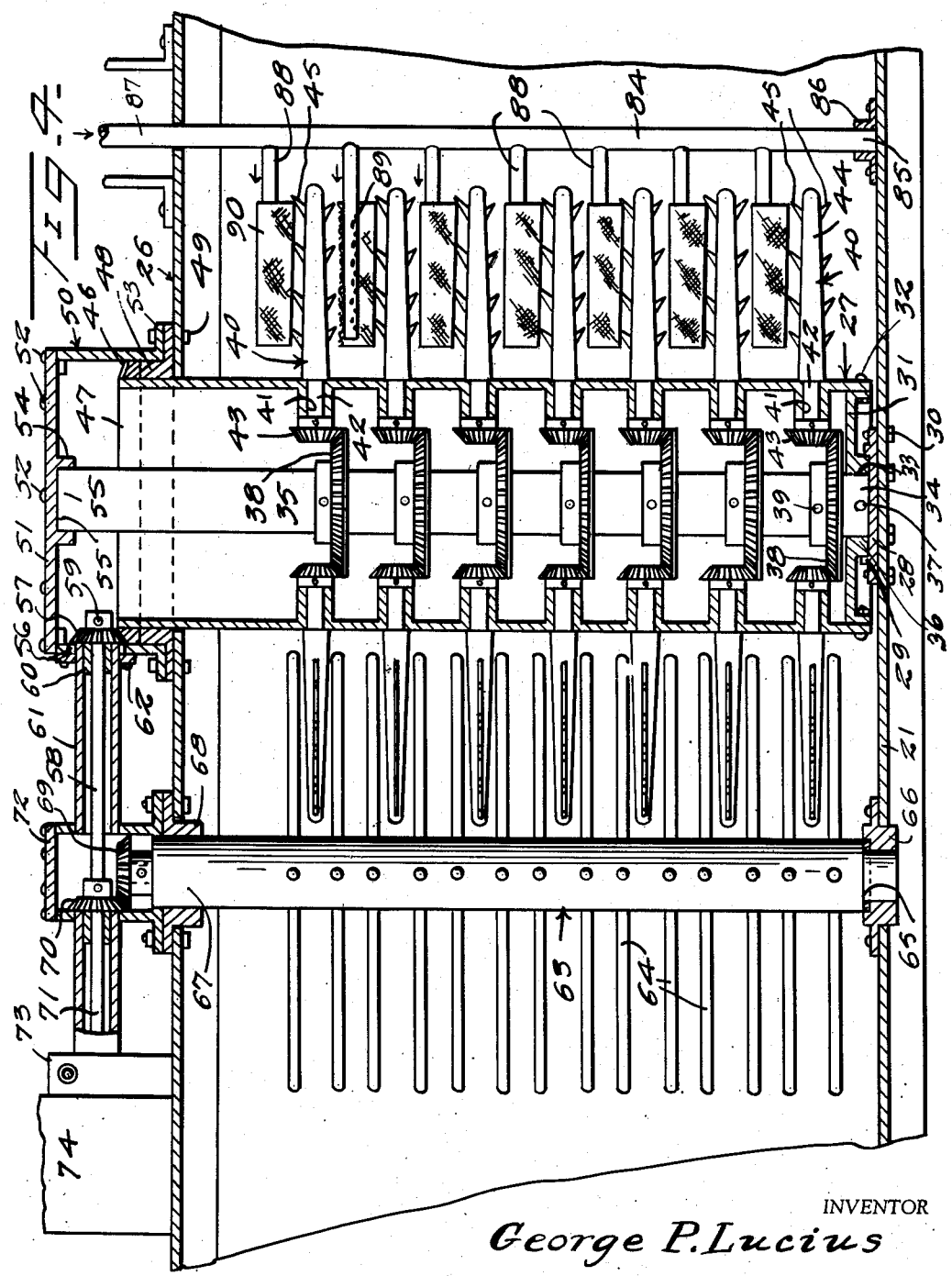

2,651,160

UNITED STATES PATENT OFFICE 2,651,160

COTTON HARVESTER

George P. Lucius, Drew, Miss.

Application April 27, 1950, Serial No. 158,474

1 Claim. (Cl. 56—44)

This invention relates to cotton harvesters generally and more particularly a machine having vertically mounted rotating picking means associated with a moistening device and suction means.

In the operation of a mechanical cotton picker having rotatably mounted picking spindles as disclosed in my co-pending application filed December 16, 1946, Serial Number 716,571, now Patent 2,512,109, it has been found that the cotton can be more efficiently picked and handled if a limited amount of moisture is introduced to the picking means during its rotation through the picking cycle. Furthermore, that higher speed operation can be attained by placing a doffer means under suction during operation adjacent to the cotton picking means.

It is therefore an object of the present invention to provide a compact cotton picking unit having spindle carrying cylinders rotatable in a moisturized compartment.

Another object is to provide a cotton picker having cooperative moisturized rotating pickers arranged for spaced operation adjacent cotton removing means in a compartment from which the cotton is drawn by suction.

A further object is to provide a picker moistening means in a cotton harvester.

A still further object is to provide a compact closed cotton picking machine having a suction fan for removing the picked cotton.

Another object is to provide means for rotating a large number of picking spindles with a rotating doffing means.

With the above and other objects in view, my invention consists in the arrangement, combination and details of construction disclosed in the drawings and specification, and then more particularly pointed out in the appended claim.

In the drawings:

Figure 1 is a top plan view of the cotton harvester of this invention.

Figure 2 is a side elevation.

Figure 3 is a side elevation taken on line 3—3 of Figure 1 with certain parts broken away and shown in section.

Figure 4 is an enlarged side sectional view of the rotary spindle and doffing means taken on line 4—4 of Figure 1.

Figure 5 is a section taken on line 5—5 of Figure 3.

Figure 6 is an enlarged view with parts broken away and shown in section of one of the wetting flaps.

Figure 7 is an enlarged detail view taken on line 7—7 of Figure 5.

Referring now in detail to the drawings the numeral 10 designates generally the present harvester of this invention which is formed as a pair of laterally spaced elongated bodies or units 11 and 12 joined together and arranged for straddled operation along a row of cotton plants or bushes. The spacing of the bodies 11 and 12 is preferably about 6 inches apart so as to provide a channel 13 of just sufficient width to allow the cotton plants to pass therethrough as the machine 10 is drawn forwardly by a tractor or any other suitable drawing means. Bodies 11 and 12 are joined together by suitable spaced cross members 14 and 15 extending therebetween as well as a front connecting bar 16 secured at opposite ends to the nose portions 17 and 18. The height of the cross bar 16 is sufficient to clear the cotton plants and is provided with a suitable eye 19 adapted for connection to a tractor coupling 20 or like connecting means attached thereto for operative movement of the machine in a cotton field. Although the cross members 14 and 15 and the connecting bar 16 are shown as permanently affixed to the units 11 and 12 for simplicity of illustration it will be readily understood that in those instances where different spaced rows of cotton plants are to be worked that these connecting means can be made adjustable.

Each of the units 11 and 12 is formed with a suitable base structure 21, side walls 25 formed as metal panels and a closed top portion 26. The panel construction of the side walls 25 provides for ready access to the interior of each unit and suitable doors as at 94 hinged to the adjacent panels as at 95 having an outwardly extended latch 96 may be provided as shown in Figure 2. The units are suitably mounted on outwardly positioned wheels 22 carried by spur axles 23 secured to each respective outer wall as at 97.

Each of the bodies 11 and 12 is completely enclosed except for opened portions 24 formed in their adjacent sides and opening into channel 13 through which the cotton plants are engaged by the rotary picking means as hereinafter explained. Protection of the picking means against undesired whipping by the branches of the plants is provided by parallel protecting bars 98 placed across the openings 24 in spaced relationship relative to each other with opposite ends carried by suitable supports 99 as best illustrated in Figure 5.

Mounted vertically within each unit 11 and 12 and spaced inwardly of openings 24 is a rotatable picker drum 27 of cylinder-like construction carried by a bottom bearing mount 28 bolted to the base 21. Mount 28 is formed with an upstanding circular flange 29 which forms a cup-like raceway. The drums 27 are provided with a removable bottom end plate 31 secured peripherally to the side wall of the drum as by studs 32 or like securing means. The bottom plate 31 is centrally apertured as at 33 to receive the bottom end 34 of a drum shaft 35 extended therethrough as best illustrated in Figure 4. Plate 31 has an integrally formed dependent bearing shoulder 36 of sufficient length and peripherally dimensioned to fit within the bearing flange 29 to allow for free rotation of the cylinder supported by the mount 28. The drum shaft 35 in its installed position is secured to the bottom plate 31 for rotation therewith by a suitable key or pin 37 extended therebetween. Carried for rotation with the drum shaft 35 are a plurality of spaced bevelled gears 38 keyed to the shaft by suitable pins 39 or like securing means. The arrangement and spacing of gears 38 are such as to provide for rotation of a plurality of cotton picking spindles 40 carried by each drum 27 on rotation of the carrying drum as hereinafter explained. Each of the spindles 40 is mounted in one of a plurality of sleeve-like sockets formed in the side wall of each drum and opening outwardly from the interior thereof. Sockets 41 are positioned in given planes corresponding to the driving plane of a corresponding gear 38 and open radially of the drum surface. Each spindle 40 is of tubular construction and of sufficient length to extend through the adjacent side opening 24 to engage cotton plants passed through channels 13 with the inner ends 42 of the spindles rotatably extended through the carrying socket 41. Positioned within the cylinders 27 and attached to each spindle end 42 is a smaller gear 43 meshed with an appropriate larger gear 38 carried by the drum shaft 35. The exposed sides 44 of each spindle 40 are suitably formed to position and carry outwardly extendable cotton picking fingers 45 which are rotated with the spindles during engagement with the cotton plant to remove the cotton bolls therefrom. This arrangement of the spindles 40 in which they are radially positioned of a carrying drum 27 and geared to shaft 35 provides for rotation of each spindle about its own axial center line as it is rotated about the axial center line of the drum. The positioning and ratio of meshed gears 38 and 40 is such as to attain approximately four revolutions of each spindle during engagement with each cotton bush. This effects rotation of the fingers during the time that they are within the bush while at the same time the bush is passing through the radial path traversed by each spindle 40 as it is rotated by its carrying drum 27.

Rotation of the drums 27 is provided by having each drum formed with a peripheral gear 46 positioned at its top portion 47 or the end opposite from plate 31 by which the drum is adapted for geared rotation. Encircling the drum top 47 under the peripheral gear 46 is a suitable bearing means 48 adjustably secured to the top portion 12 of the unit structure by suitable bolts as at 49. Positioned over and around the drum top 47 is a suitable drum cover 50 preferably formed with a removable lid 51 secured thereto by cap screws 52 or like means. Cover 50 is provided with a surrounding flange portion 53 suitably formed for bolted down attachment under bolts 49. Downwardly extending from lid 51 is a top bearing 54 dimensioned to rotatably receive the top end 55 of the drum shaft 35. The cover 50 is formed with a side aperture 56 adapted to receive inserted therethrough a bevel drive gear 57 drivingly carried by a drive shaft extension 58 and keyed thereto as at 59 for meshed driving engagement with the peripheral gear 46 carried by drum top 47. Gear 57 is provided with a suitable thrust bearing 60 with shaft extension 58 enclosed in a drive tube 61 bolted to the cover 50 as at 62.

Spaced rearwardly from the drum 27 of each respective unit 11 and 12 is a vertically mounted rotary stripper or doffing means 63 formed with a plurality of radially extending doffing arms 64 adapted to strip cotton from the spindles 40. The doffer 63 is formed with a shouldered bottom end or shaft 65 carried by a suitable thrust bearing 66 bolted to the base 21. The upper end 67 of the doffer 63 is journaled at the top of the structure as at 68. Secured to the end 67 of the doffer 63 is a bevel gear 69 placed in driven engagement with a bevel driving gear 70 carried by drive shaft 71 having a suitable housing 72 formed as part of or suitably connected to drive tube 61. Drive shaft 71 and extension 58 may be formed as one shaft, as shown, or as two coupled shafts which are in turn coupled through a suitable transmission or gear box 73 to a power unit 74 capable of rotating both the doffer 63 and the drum 27 associated therewith. I have found that a portable gasoline engine provides a very efficient drive means for the respective units 11 and 12, however, it is obvious that there are other driving means that would prove adequate.

Spaced adjacent the doffer 63 as best illustrated in Figure 3 is a vertically positioned hollow suction pipe 75 of sufficient length to extend from adjacent the floor 76 of base 21 to and through the top 26 of its respective unit. Pipe 75 (Figure 7) is formed with a side opening 77 that faces toward the doffer 63 and is spaced adjacent the radial sweep of arms 64 carried by the doffer. The positioning of opening 77 adjacent the arms 64 and the dimensions of its interior or passage 78 opening exteriorly of the unit is such as to allow for the cotton stripped from the pickers by the doffing means to be removed by suction from the unit for collection exteriorly thereof. Suction for withdrawal of the cotton is provided by a suction fan 79 having a plurality of rotary blades 80 mounted within a suitable housing connected to pipe 75. Delivery of cotton to the rear of machine 10 is provided by a suitable spout 81 opening downwardly as at 82. The fan 79 is preferably mounted on the top 26 adjacent the power unit 74 and is drivingly connected to the transmission 73 by a suitable power take-off shaft 83. This arrangement of a power take-off drive to the fan provides an efficient compact unit, however, in case a larger unit is desired it will be obvious that a separate power unit for the fan could be mounted for direct drive therewith.

Positioned forwardly of the rotary drum 27 in each of the units 11 and 12 is a vertically extending standpipe 84 having a closed end 85 inserted in a socket-like holder 86 bolted to the base 21 with its opposite end 87 opening upwardly of the top 26 as best illustrated in Figure 4. Carried by the standpipe 84 and extending at right angles thereto are a plurality of nipples 88 that extend within the peripheral travel of spindles 40 but which are spaced between respective rows of said spindles. Each of the nipples 88 are provided with fluid conducting passages leading exteriorly thereof as at 89. Wrapped around each nipple with a portion hanging down therefrom is a flap or tab 90 formed of fabric or like fibrous material capable of conveying water as a wick. Each flap 90 is positioned and proportioned so as to engage with the picking fingers 45 of the spindles 40 as they are rotated past the standpipe 84 by their respective drums 27. In this manner moisture from the flaps 90 is conveyed to the fingers and spindles. A supply of water to the flaps 90 for their wetting is provided by a water tank or reservoir 91 bracketed to the top 26 of each respective unit as at 92. Tank 91 is provided with a suitable capped filler inlet as at 93. While each tank 91 is shown connected directly to its respective standpipe 84 for simplicity of illustration it will be obvious that a flexible coupling therebetween would be found desirable as being more resistant to vibration.

I have found that alternate working of the cotton bushes as attained in my machine 10 by having the picking drums 27 spaced one ahead of the other effects a more efficient picking operation than if the drums were disposed opposite each other for the reason that deeper penetration of the spindle arms 40 rotated through the bushes can be attained without danger of interference from oppositely spaced arms with a relatively narrow construction. Furthermore, that the moistened flaps 90 convey just the right amount of fluid to the picking fingers 45 to effect proper conditioning of the cotton for ready handling.

While I have described above in detail the preferred structural embodiment for purposes of illustration, it is to be understood that my invention is not to be limited to the specific means shown and described but that, in fact, widely different means may be employed in the practice of the broader aspects of my invention.

I claim:

In a cotton harvester, a frame, a rotatable picking drum carried thereby, means in said frame operatively connected with said drum for rotating said drum, picker spindles spaced radially about said drum, outwardly inclined diametrically opposed pairs of teeth in said spindles, the teeth of each pair being positioned at an acute angle relative to each other and to said spindle and means for rotating said spindles correlated with said means for rotating said drum, said means comprising ring gears carried by said drum and coacting bevel gears carried by each spindle, the gear ratio being so arranged as to provide approximately four rotations of each spindle to each rotation of said drum.

GEORGE P. LUCIUS.

References Cited in the file of this patent

UNITED STATES PATENTS

| Number | Name | Date |
| --- | --- | --- |
| 1,067,691 | Teel | July 15, 1913 |
| 1,747,566 | Berry | Feb. 18, 1930 |
| 1,751,389 | Bledsoe, Jr. | Mar. 18, 1930 |
| 1,894,198 | Rust et al. | Jan. 10, 1933 |
| 1,926,337 | Johnston | Sept. 12, 1933 |
| 2,025,514 | Johnston | Dec. 24, 1935 |
| 2,140,631 | Johnston | Dec. 20, 1938 |
| 2,333,965 | Weems | Nov. 9, 1943 |
| 2,369,708 | Baker et al. | Feb. 20, 1945 |
| 2,433,083 | Baker et al. | Dec. 23, 1947 |
| 2,440,767 | Baker | May 4, 1948 |
| 2,467,722 | Baker | Apr. 19, 1949 |